United States Patent
Schwarzmann

(10) Patent No.: US 8,036,908 B2
(45) Date of Patent: Oct. 11, 2011

(54) SYSTEM AND METHOD FOR THE ASSEMBLY OF PROGRAMS

(75) Inventor: Winfried Schwarzmann, Rauenberg (DE)

(73) Assignee: SAP Aktiengesellschaft, Walldorf (DE)

( * ) Notice: Subject to any disclaimer, the term of this patent is extended or adjusted under 35 U.S.C. 154(b) by 1717 days.

(21) Appl. No.: 10/961,610

(22) Filed: Oct. 8, 2004

(65) Prior Publication Data

US 2006/0080115 A1    Apr. 13, 2006

(51) Int. Cl.
*G06Q 99/00*    (2006.01)
(52) U.S. Cl. ......... 705/1.1; 455/406; 455/407; 455/408
(58) Field of Classification Search .............. 705/1, 400, 705/1.1; 455/406–408
See application file for complete search history.

(56) References Cited

U.S. PATENT DOCUMENTS

| 6,442,749 | B1 * | 8/2002 | Hirao et al. ............... 717/170 |
| 6,993,769 | B2 * | 1/2006 | Simonson et al. ........... 719/311 |
| 7,085,754 | B2 * | 8/2006 | Sinnott, Jr. .................. 707/2 |
| 7,174,342 | B1 * | 2/2007 | Scheurich et al. ............ 1/1 |
| 7,451,299 | B2 * | 11/2008 | Zatloukal et al. ........... 712/236 |
| 2003/0041312 | A1 * | 2/2003 | Fueki .......................... 717/100 |
| 2003/0139970 | A1 * | 7/2003 | Badura et al. ............... 705/26 |
| 2003/0200161 | A1 * | 10/2003 | Bayer et al. ................. 705/29 |
| 2004/0045006 | A1 * | 3/2004 | Simonson et al. ........... 719/315 |
| 2004/0263152 | A1 * | 12/2004 | Ahrikencheikh ........... 324/158.1 |
| 2006/0072505 | A1 * | 4/2006 | Carrillo et al. .............. 370/331 |

FOREIGN PATENT DOCUMENTS

WO    WO/03060724    * 7/2003

* cited by examiner

*Primary Examiner* — Akiba Robinson Boyce

(74) *Attorney, Agent, or Firm* — Blakely Sokoloff Taylor & Zafman LLP

(57) ABSTRACT

Embodiments of the invention are generally directed to a system and method for the assembly of a program having one or more methods. In an embodiment, one or more sequences for the methods of the program are determined based, at least in part, on data format information provided by the methods. In one embodiment, one of the sequences is selected based, at least in part, on a data format efficiency computation.

26 Claims, 8 Drawing Sheets

SYSTEM AND METHOD FOR THE ASSEMBLY OF PROGRAMS

TECHNICAL FIELD

Embodiments of the invention generally relate to the field of data processing and, more particularly, to a system and method for the assembly of programs.

BACKGROUND

In the past, enterprises were willing to reorganize their business processes to fit them into the relatively static structures of business software systems. More recently, however, enterprises have been more reluctant to reorganize their business processes for reasons such as the expense incurred by the reorganization. In addition, many enterprises are interested in retaining (rather than changing) business processes that have proved to be successful.

A conventional approach to providing more flexible business software systems involves the configuration of system process flows with parameters. The individual values of these parameters are set during customization of the software and respected by the processes during runtime. The configuration of process flows via parameters, however, is encumbered by a number of limitations. For example, the way in which certain parameter values influence the process flow within the system is not always clear to a user. This limitation can be partly addressed through thorough documentation and/or the expertise provided by consultants. Either of these partial solutions, however, increases the costs of the software implementation.

A second limitation of the conventional approach is that the complexity of the coding of business software increases disproportionately with the number of parameters. The increase in the complexity of the coding leads to a greater possibility of coding faults, especially for unusual parameter value combinations. This complexity and the resulting maintenance and support challenges cause functional extensions of the software to be developed more slowly or not at all.

SUMMARY OF THE INVENTION

Embodiments of the invention are generally directed to a system and method for the assembly of a program having one or more methods. In an embodiment, one or more sequences for the methods of the program are determined based, at least in part, on data format information provided by the methods. In one embodiment, one of the sequences is selected based, at least in part, on a data format efficiency computation.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for the assembly of a program having one or more methods. In an embodiment, one or more sequences for the methods of the program are determined based, at least in part, on data format information provided by the methods. In one embodiment, one of the sequences is selected based, at least in part, on a data format efficiency computation.

Figure 1:
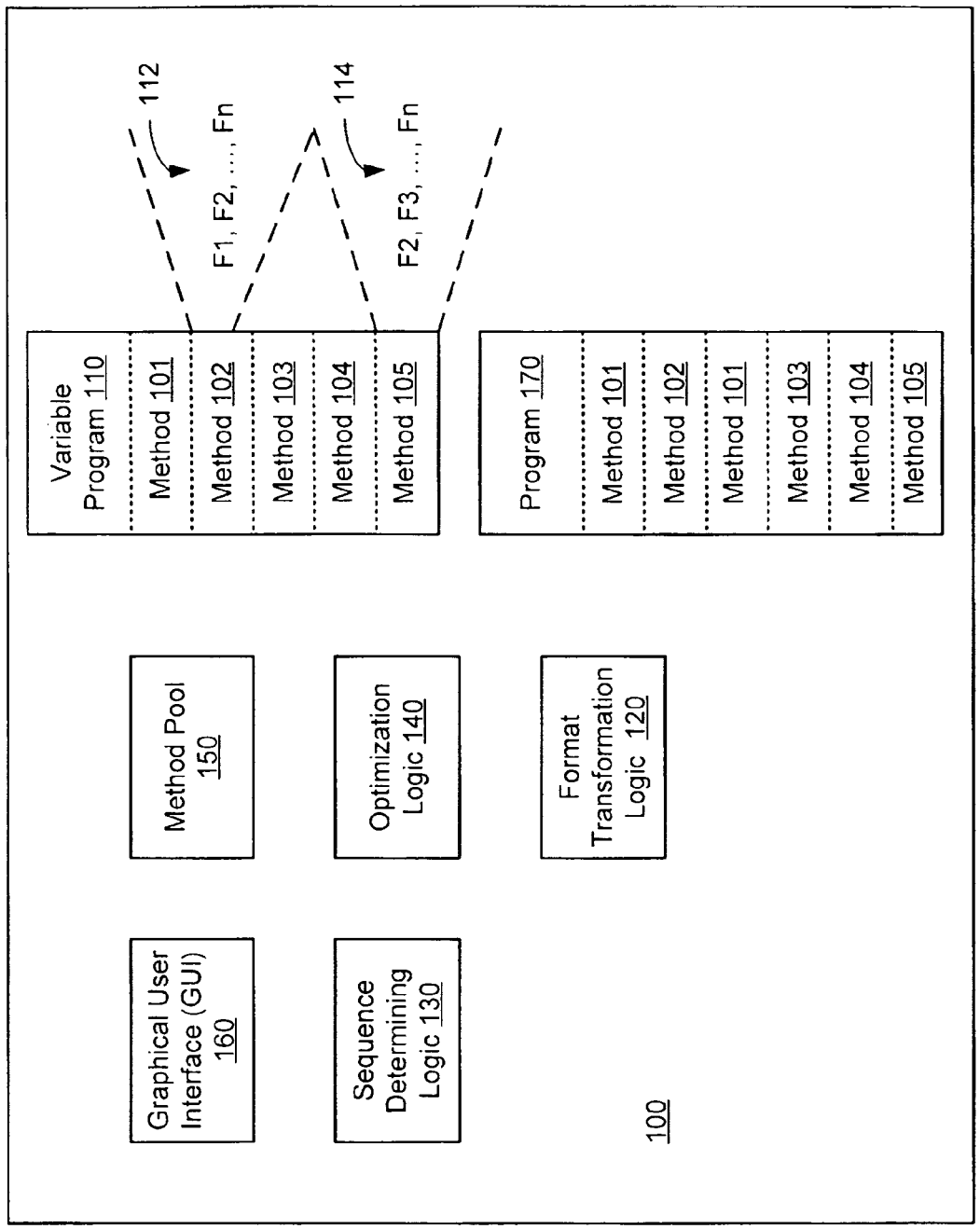
FIG. 1 is a block diagram of selected elements of a system for the assembly of programs according to an embodiment of the invention.

FIG. 1 is a block diagram of selected elements of a system for the assembly of programs, according to an embodiment of the invention. In an embodiment, system 100 may be part of a multi-tiered network. The multi-tiered network may be implemented using a variety of different application technologies at each of the layers of the multi-tier architecture, including those based on the Java 2 Enterprise Edition™ ("J2EE") specification (e.g., the Websphere platform developed by IBM Corporation), the Microsoft.NET platform, and/or the Advanced Business Application Programming ("ABAP") platform developed by SAP AG. The J2EE specification refers to any of the J2EE specifications including, for example, the Java 2 Enterprise Edition Specification v1.3, published on Jul. 27, 2001.

System 100 includes variable program 110. A "variable program" refers to a finite set of methods (e.g., methods 101-105) sharing a common interface. In an embodiment, a user may select, at least in part, the methods of variable program 110 on a graphical user interface (GUI). Given variable program 110, the assembly of program 170 involves a sequential arrangement of methods 101-105. Each of methods 101-105 exists at least once in this sequence. Eventually, execution of program 170 involves execution of its methods according to this sequence (e.g., 101, 102, 101, 103, 104, 105).

In general, methods 101-105 of variable program 110 can be assembled in any order to form program 170. In some cases, however, direct/indirect predecessor/successor relationships may exist between methods 101-105 that influence the order of the methods. For example, method 101 may represent a required pre-processing step for both methods 102 and 103. This outsourcing of common coding facilitates maintenance of the code. Additionally, grouping relationships among the methods may require that, besides the originally selected methods (e.g., methods 102-105 selected by a user), other methods (e.g., 101) have to be included in the variable program. In general, this inclusion is performed by system 100. In an embodiment, methods 101-105 all work on a given set of data. The data may include (at least initially) a problem description and may also include (e.g., after being processed) a solution description (or a partial solution description).

In some cases, methods 101-105 cannot all process the data (or cannot process the data efficiently) in the format in which it is imported. In such cases, the format of the data is transformed, as needed, before each of methods 101-105 is called. In principle, each of methods 101-105 could carry out these data format transformations as a pre-processing operation. These data format transformations, however, often do not depend on the logic of the methods. Therefore, having them incorporated in the methods likely results in code duplication. Both of these concerns are important to the maintenance of the code.

In an embodiment, each method of a variable program defines a set of data formats specifying allowable data formats for imported data. For example, method 102 defines data formats 112. Similarly, method 105 defines data formats 114. As is further described below, with reference to FIG. 5, data formats 112 and 114 may be subsets of a superset of data formats that is defined for input/output data objects.

Format transformation logic 120 provides logic to transform data structured according to a first data format to one or more other data formats. The transformations may be direct (e.g., from format A to format B) or indirect (e.g., from format A to format B via format C). Methods 101-105 need not include implementations of format transformation logic because system 100 provides those implementations in format transformation logic 120.

Sequence determination logic 130 provides, on the one hand, logic to respect the method interdependencies. Examples of method interdependencies include direct/indirect predecessor/successor relationships between, or grouping relationships among, methods. On the other hand, it provides logic to determine which data formats are available (e.g., can be reached) from a given data format. In one embodiment, sequence determination logic 130 includes a format graph to define which format transformations are possible. In such an embodiment, sequence determination logic 130 may propose or compare multiple possible paths from a given start format to a given end format. Format graphs are further described below with reference to FIG. 5.

Optimization logic 140 includes logic to determine one or more data format efficiency computations. For example, a processing cost may be associated with processing data structured in a given format. Similarly, a format transformation cost may be associated with transforming data from one format to another format. In an embodiment, optimization logic 140 determines an optimal sequence for methods 101-105 based, at least in part, on processing costs and/or transformation costs. The term "optimal sequence" refers to a sequence of methods that, relative to other possible sequences, provides a result that approaches an optimal cost. Optimization logic 140 is further described below with reference to FIG. 4.

In an embodiment, method pool 150 encompasses all methods which may be used to define variable program 110. Graphical User Interface(s) (GUI) 160 provide one or more user interfaces to access system 100. In an embodiment, GUI 160 may be used to define variable program 110. In such an embodiment, GUI 160 may display method pool 150 to a user. The user may then select methods from method pool 150 to define variable program 110. The user may also arrange the selected methods to pre-define program 170. GUI 160 provides functionality to check the validity of this pre-defined method sequence including, for example, the determination of a suitable format for each method. Alternatively (or additionally), GUI 160 provides functionality to find a cost-optimal program based, at least in part, on the user-selected set of methods.

Figure 2:
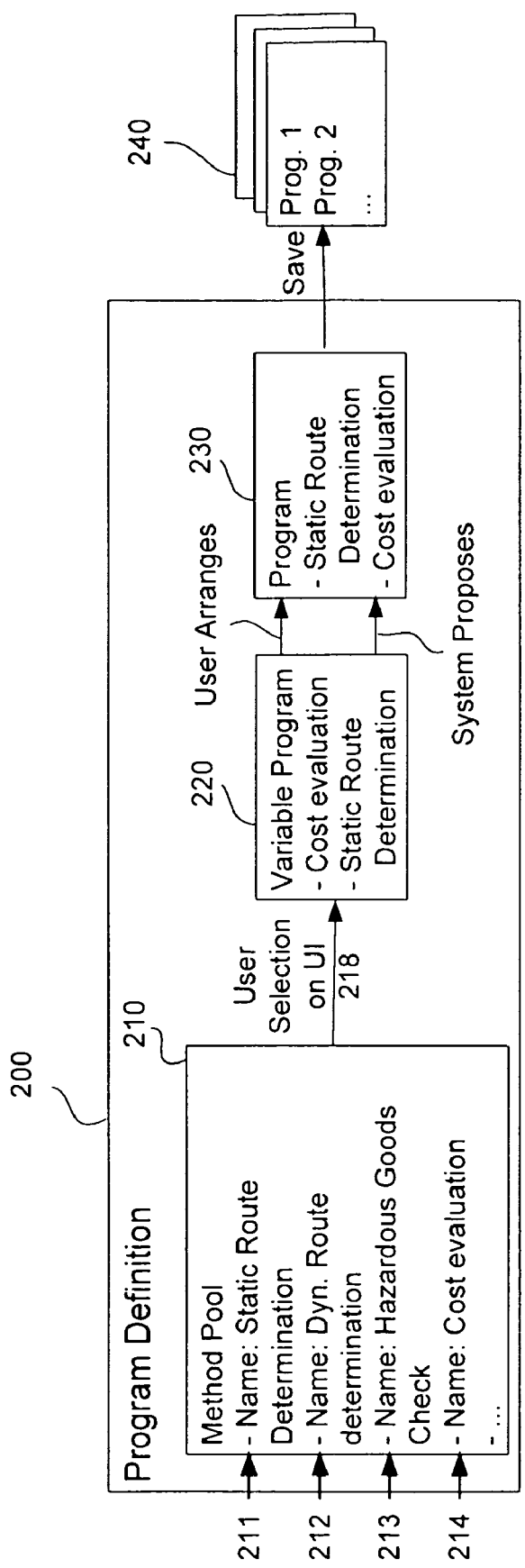
FIG. 2 is a block diagram illustrating selected aspects of a graphical user interface (GUI), according to an embodiment of the invention.

FIG. 2 is a block diagram illustrating selected aspects of a graphical user interface (GUI) 200, according to an embodiment of the invention. In one embodiment, GUI 200 provides an interface to define a variable program (e.g., variable program 220) and/or a program (e.g., program 230). GUI 200 includes, for example, method pool 210, variable program 220, and program 230. Method pool 210, in turn, includes methods 211-214. Methods 211-214 may be provided by a vendor or defined by a customer. As shown in FIG. 2, in one embodiment, GUI 200 displays a name and a description for each of the one or more methods in method pool 210. Additionally, GUI 200 may display the type of each method. In an embodiment, methods 211-214 are selectable via a cursor control device. The term "cursor control device" broadly refers to an input/output device that moves a cursor within a graphical user interface. Examples of a cursor control device include (and are not limited to) a pointing device and/or a keyboard. In one embodiment, the methods of variable program 220 are selected from method pool 210, whereas the pre-definition of program 230 is realized with methods from the method pool only if no variable program 220 exists.

In one embodiment, method pool 210 is displayed in a first window of GUI 200, variable program 220 in a second, and program 230 in a third. In an alternative embodiment, method pool 210, variable program 220, and/or program 230 may be displayed (or partly displayed) in more windows and/or fewer windows of GUI 200. The term "window" refers to a scrollable viewing area on a screen.

In an embodiment, a user selects one or more methods from method pool 210 for inclusion in variable program 220 and/or program 230. For example, the user may drag and drop a method from method pool 210 to variable program 220. Alternatively, the user may provide another indication to assign a method to variable program 220 such as right clicking on the method, left clicking on the method, and the like. In addition, the user may arrange the selected methods in a particular order in program 230, or otherwise specify a sequence in which the methods are to be executed. Program 230 is stored in memory 240 which may be, for example, one or more hard disks, floppy disks, ZIP disks, compact disks (e.g., CD-ROM), digital versatile/video disks (DVD), magnetic random access memory (MRAM) devices, and other system-readable media that store instructions and/or data. In an embodiment, one or several programs may be stored in memory 240 as shown in FIG. 2.

In an embodiment, a system for the assembly of programs (e.g., system 100) supports the user during the (variable) program definition process. During method selection (or at the end of method selection) the system proposes one or more sequences for the methods of the variable program (e.g., as determined by sequence determining logic 130, shown in FIG. 1). The proposals are based on sequence determining logic 130 as described above. They may be displayed in the window of program 230. This may include considering the data formats defined by each method of the variable program (e.g., data formats 112 and 114) and the possible transformations between these formats. The sequences may also be based on one or more data format efficiency computations (e.g., as provided by optimization logic 140, shown in FIG. 1).

Figure 3A:
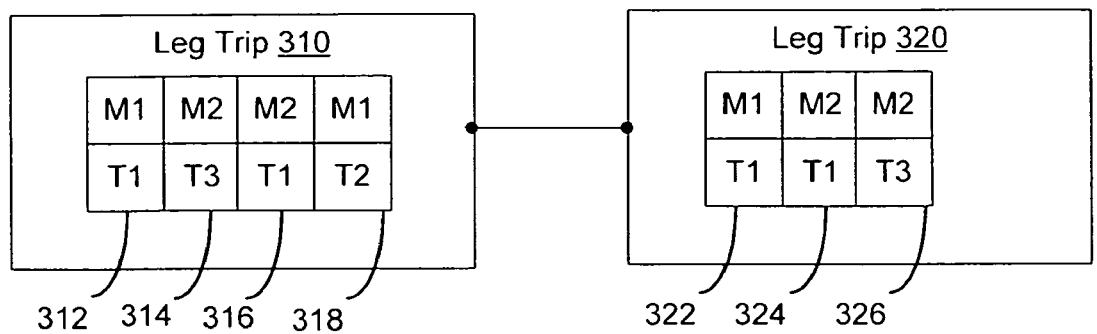
FIGS. 3A and 3B are block diagrams illustrating different structures of data with respect to different formats, according to an implemented embodiment of the invention.
Figure 3B:
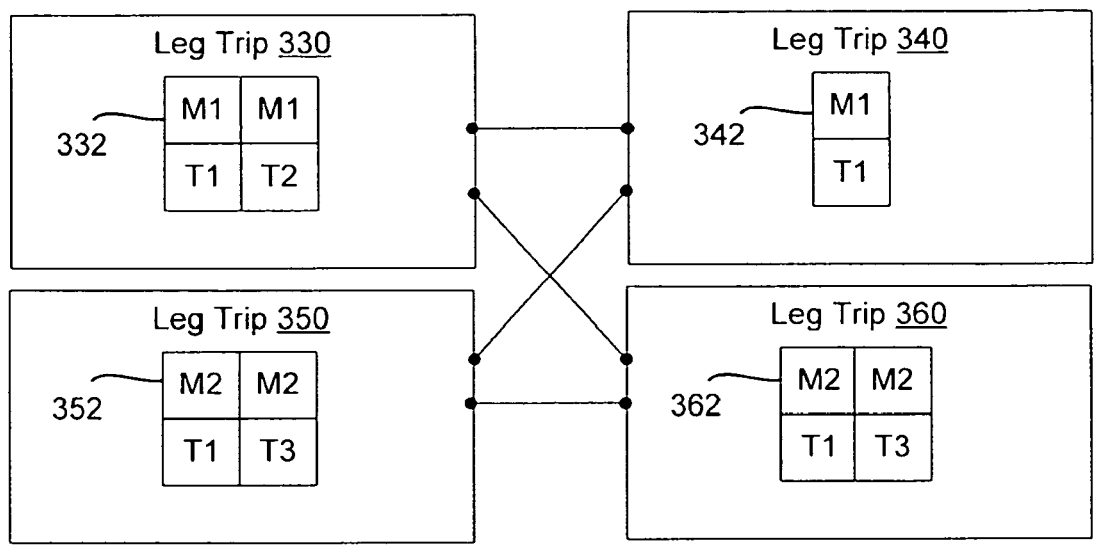

FIGS. 3A and 3B are block diagrams illustrating different structures of data with respect to different formats, according to an implemented embodiment of the invention. In one embodiment, a system for the assembly of programs (e.g., system 100) supports a routing guide service that processes requests for transportation from one location to another. Solutions to these requests include "trips" that have a sequence of "leg trips." Each leg trip contains one or a plurality of "assignments" each having a means of transportation (M) and a transportation service provider (T). In the context of a leg trip, an assignment represents one alternative for who carries out a unimodel shipment with which vehicle.

The routing guide service is implemented as a program having a basis method to create possible trips. FIG. 3A illustrates the initial data format as created by the basis method. The initial data format includes a trip with two leg trips 310 and 320 having assignments 312-318 and 322-326, respectively. The program contains additional methods to, for example, schedule a start and/or end time for the trip. FIG. 3B illustrates the data format used by the scheduling method. The scheduling method uses a data format that provides a unique means of transportation for each leg trip. The reason for this is that the scheduling of a trip includes the scheduling of a sequence of leg trips (e.g., leg trips 330 and either 340 or 360 or 350 and either 340 or 360). Each leg trip should include a unique means of transportation because the average velocity of each means of transportation is different. Thus, the assignments of leg trips 330, 340, 350, and 360 are each formatted to have a unique means of transportation as shown by 332, 342, 352, and 362, respectively.

Figure 4:
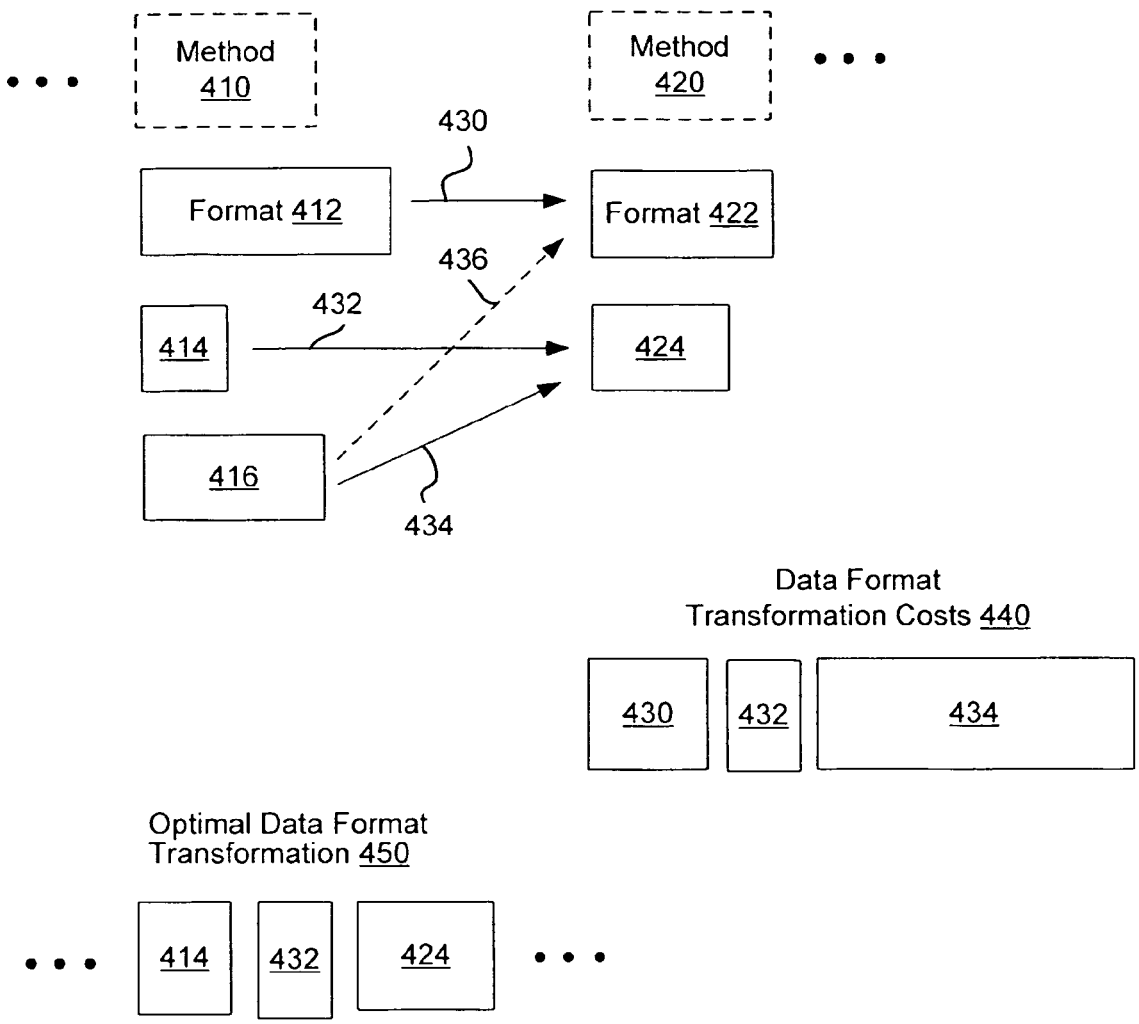
FIG. 4 is a block diagram illustrating the selection of data formats and format transformations according to an embodiment of the invention.

FIG. 4 is a block diagram illustrating the selection of data formats and format transformations according to an embodiment of the invention. FIG. 4 includes methods 410 and 420. Method 410 defines data formats 412-416 and method 420 defines data formats 422-424. In the illustrated embodiment, the width of each data format illustrates the relative magnitude of the processing cost associated with processing data in that format. Thus, since data format 412 is wider than data format 414 it incurs a greater processing cost. The term processing cost refers to the cost in system resources (e.g., time, memory, loss of concurrency, etc.) to process data structured according to a particular format.

Transformations 430-436 illustrate the transformation between data formats. For example, transformation 430 illustrates the format transformation from data format 412 to data format 422. Similarly, transformations 432 and 434 illustrate the transformation from data formats 414 and 416, respectively, to data format 424. Transformation 436 is shown by a dashed line to illustrate that data formats 416 and 422 are the same.

Reference numeral 440 illustrates calculating the data format transformation costs between methods 410 and 420. The "data format transformation cost" refers to the cost in system resources (e.g., time, memory, loss of concurrency, etc.) to transform data structured according to one format to a different format. In FIG. 4, the magnitude of each data format transformation cost is illustrated by the width of the box encapsulating transformations 430, 432, and 434, respectively. Since transformation 436 represents an implicit link between the same format used by consecutive methods, it has virtually no data format transformation cost.

Reference numeral 450 illustrates an optimal data format transformation for consecutive methods 410 and 420. The minimal costs are incurred if method 410 receives data in data format 414. In addition, the minimal costs are incurred if transformation 432 is used to transform the data format from 414 to 424 so that method 420 can process data in data format 424.

Figure 5:
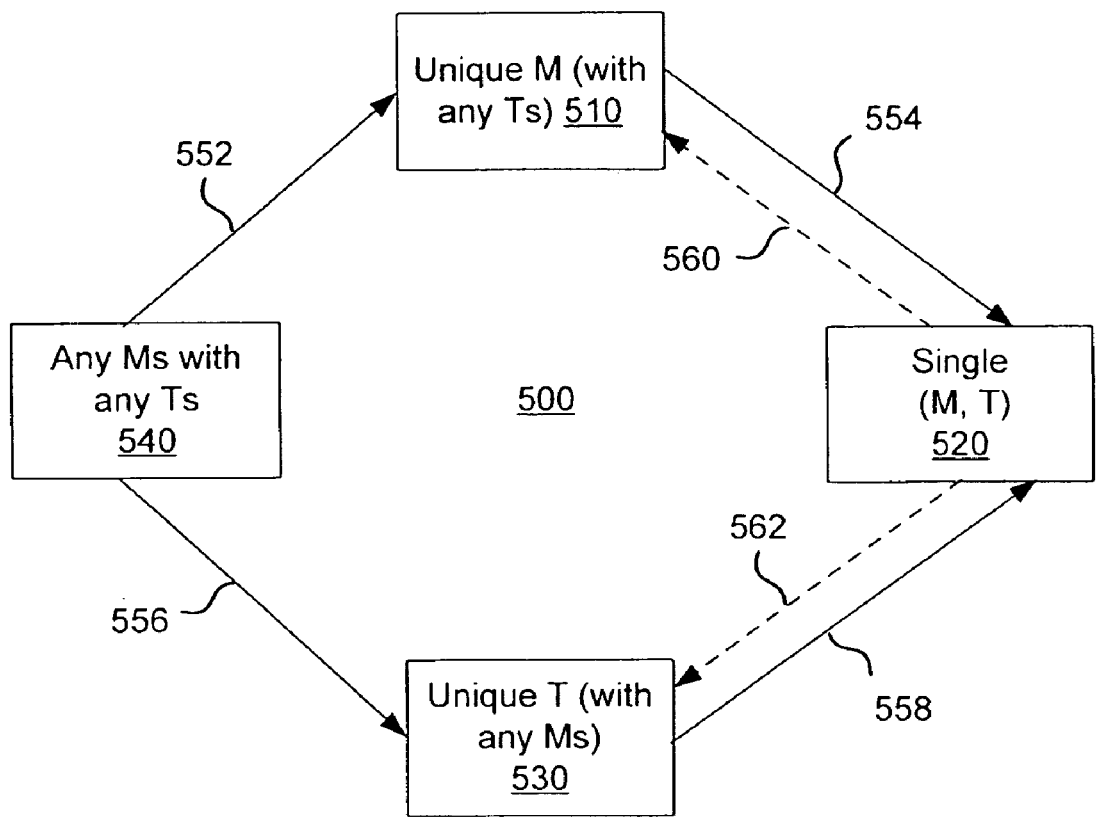
FIG. 5 is a block diagram of a format graph, implemented according to an embodiment of the invention.

In an embodiment, a format graph determines which format transformations are available for a data format. FIG. 5 is a block diagram of format graph 500, implemented according to an embodiment of the invention. For ease of discussion, the embodiment illustrated in FIG. 5 corresponds to the routing guide service introduced in FIG. 3. It is to be appreciated, however, that format graph 500 can be adapted to support virtually any variable service.

Format graph 500 includes data formats 510, 520, 530, and 540. Data format 510 includes leg trip assignments consisting of a unique means of transportation (M) and any transportation service provider (T). Data format 520 includes (leg trip) assignments consisting of a single means of transportation (M) and a single transportation service provider (T). Data format 530 includes assignments consisting of a unique transportation service provider (T) with any means of transportation (M). Data format 540 includes assignments consisting of any means of transportation (M) with any transportation service provider (T).

In the illustrated embodiment, data format 540 can be transformed into data format 510 and also into data format 530 as shown by reference numerals 552 and 556, respectively. Similarly, data formats 510 and 530 can each be transformed into data format 520 as shown, respectively, by reference numerals 554 and 558. Reference numerals 560 and 562 respectively show that data format 520 can be transformed into data format 510 and/or data format 530. In the illustrated embodiment, solid lines indicate the bundling of leg trips and dashed lines indicate the splitting of leg trips. Splitting may be necessary to reach uniqueness of means of transportation and/or transportation service provider in leg trip assignments. In contrast, bundling may merely be reasonable for efficiency reasons. For example, the bundling transformations 560 and 562 both result in fewer leg trips and therefore fewer trips. This may avoid identical processing by methods whose functionality focuses on the uniqueness of at most one of means of transportation (format 510) and transportation service provider (format 530).

The following is a mathematical description of cost determinations according to one embodiment of the invention. The description is provided as an example of these determinations. In an alternative embodiment, cost determinations may be calculated using different and/or additional considerations.

A method r is a function with a given interface. Without loss of generality it can be assumed that this common interface comprises a reference to the context. A context refers to a collection of data objects that store, in general, both a problem description and possible solutions to the described problem. The input interface may further include an object containing parameter values to influence the behaviors of the method. Let R be the set of all methods. There may exist direct/indirect predecessor/successor relationships among the methods in R, but they do not result in cycles. A method operates on a context by reading, setting, or changing data object values.

Any sequence $(r_1, \ldots, r_n)$ with methods $r_i \in R$ is called a program. The corresponding set $\{r_1, \ldots, r_n\}$ is called a variable program. Let $F(r) \subset F$ be the set of all formats on which the method $r \in R$ can work. The format graph $G=(F,T)$ expresses with its directed edges $T \subset F \times F$ into which other formats a given format can be (directly) transformed.

A program $(r_1, \ldots, r_n)$ is called valid if it complies with the predecessor/successor relationships among the methods $\{r_1, \ldots, r_n\}$. Additionally, it is called valid for an initial format $f_0$ if there exists at least one path $(f_1, \ldots, f_n)$ in G such that $f_i \in F(r_i)$ for $i=1, \ldots, n$ holds. The notations $(f_0, r_1, \ldots, r_n)$ or $(f_0, r_1, f_1, \ldots, f_n, r_n)$ signify the unformatted or formatted program, respectively. A path $(f_1, \ldots, f_n)$ in G means that $(f_{i-1}, f_i) \in T$ for $i=1, \ldots, n$ holds. The notation $(f_0, r_1, f_1, \ldots, f_n, r_n)$ signifies that before method $r_1$, can operate on the format $f_1$ the transformation $(f_{i-1}, f_i) \in T$ takes place. The corresponding definitions hold if the first method is the creator of the initial format. Notations: $(r_1, \ldots, r_n)$, $(r_1, f_1, \ldots, f_n, r_n)$. Formatting a program $(r_1, \ldots, r_n)$ means to select for each method $r_1$, a format $f_1 \in F(r_i)$.

The function $c(r_i): F \rightarrow IR_0^+$ is called the cost function of method r. It expresses how much it costs when method r works on an acceptable format $f \in F(r)$. A transformation cost may be based on a cost function c: $T \rightarrow IR_0^+$ for the format graph. It is $dom(c_r) \subset F(r)$ for each method r. The cost of a formatted program $\overline{(f_0, r_1, f_1, \ldots, f_n, r_n)}$ is $\Sigma_{i=1}^n c(r_i, f_i) + \Sigma_{i-1}^n c(f_{i-1}, f_i)$.

The optimization of a variable program $(f_0, \{r_1, \ldots, r_n\})$ refers to selecting a formatted program $(f_0, r_1, f_1, \ldots, f_n, r_n)$ that incurs a minimal cost. The optimization of variable programs may be modeled as a single-setup-resource scheduling problem including: production activities $A_P$, and $a_S = \text{setup}(a_P) \in A_S$ being the setup activity of $a_P \in A_P$; and modes M, and d(m) being the duration of $m \in M$ (further, let $M(a) \subset M$ be the set of all modes of activity $a \in A = A_P + A_S$); compatibility links between modes; and direct/indirect predecessor/successor links between production activities.

This mathematical description suggests the use of the following terms to describe an embodiment of the invention. A "variable program" is a set of methods. This set of methods may be a subset of the methods in a method pool (e.g., method pool 150, shown in FIG. 1), which may be selected by a user via a GUI (e.g., GUI 160, shown in FIG. 1). A "program" refers to a sequence of the methods of the variable program. A valid program" refers to a program that respects certain program validity criteria. For example, a valid program may respect predecessor/successor relationships among methods and/or grouping relationships among methods. A "grouping relationship" enables code sharing as it allows requiring that, with a given method, one or more other methods (e.g., for shared and, thus, outsourced pre- or post-processing steps) are to be selected. A "formatted program" refers to selecting a format for each method of a program based, at least in part, on data format information provided by each method. A "valid formatted program" refers to additionally respecting transformation restrictions (e.g., as defined by format graph 500, shown in FIG. 5) when selecting data formats for the methods of a formatted program.

Figure 6:
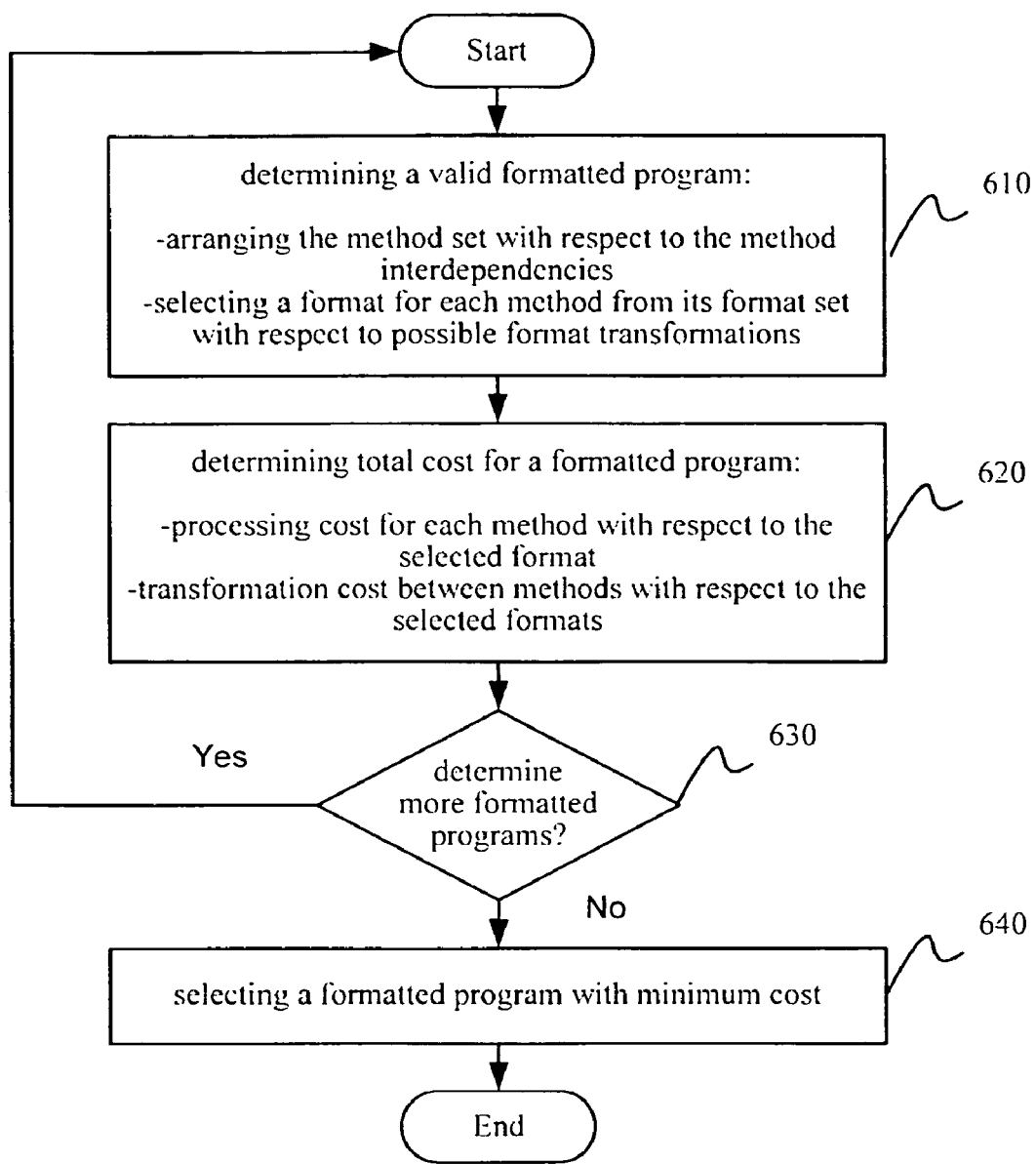
FIG. 6 is a flow diagram illustrating certain aspects of a process for assembling a program, according to an embodiment of the invention.
Figure 7:
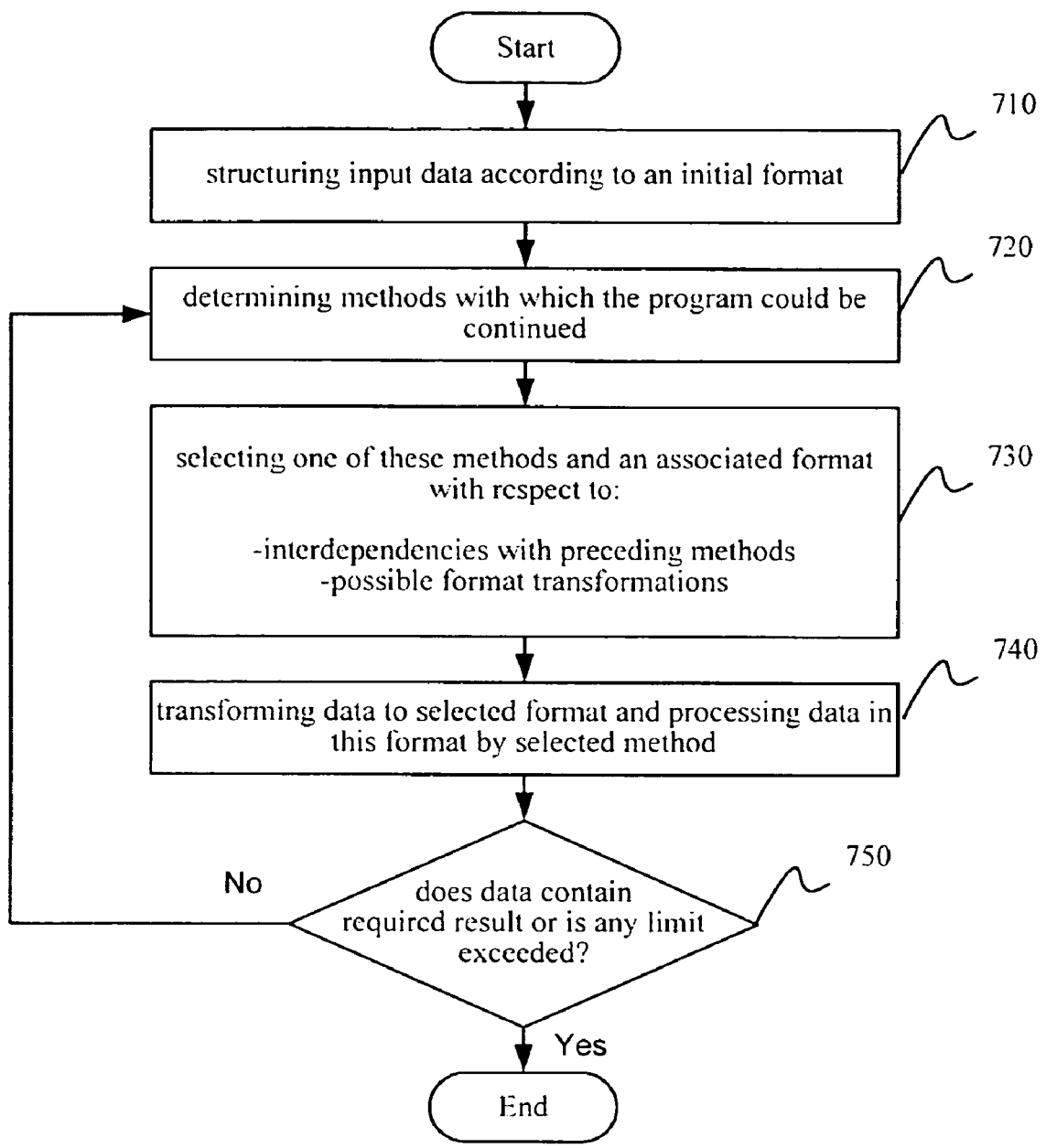
FIG. 7 is a flow diagram illustrating certain aspects of a method for assembling a program at runtime, according to an embodiment of the invention.

Turning now to FIGS. 6-7, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 6 is a flow diagram illustrating certain aspects of a process 600 for assembling a formatted program, according to an embodiment of the invention. In an embodiment, process 600 assembles a valid and efficient (e.g., cost-optimal) formatted program before runtime. Referring to process block 610, a valid formatted program is determined. In one embodiment, determining a valid formatted program includes selecting a sequence for the methods of a variable program. In an embodiment, a data format is selected for the methods of the sequence based, at least in part, on data format information provided each method.

A sequence of data format transformations may be selected for each pair of consecutive methods. The term "pair of consecutive methods" refers to any two methods that are consecutively executed (e.g., methods 410 and 420, shown in FIG. 4). In an embodiment, the determination of the data format transformation is based, at least in part, on method-independent data format transformation information. The term "data format transformation information" refers to information that specifies which data format transformations are possible. The term "method-independent" indicates that the methods need not include the data format transformation information. One example of "method-independent data format transformation information" is a format graph (e.g., format graph 500, shown in FIG. 5) that defines which transformations are available between various data formats. In an embodiment, the sequence of data format transformations may include one or a plurality of transformations. Referring again to FIG. 5, for example, data format 540 can be transformed into data format 520 either by the sequence of format transformations shown by 552-554 or by the sequence of format transformations shown by 556-558.

The validity of a program and/or the validity of a formatted program may be determined. Determining the validity of a program refers to, for example, ensuring that the interdependencies among the methods of the program are respected. In one embodiment, the interdependencies are based, at least in part, on direct/indirect predecessor/successor relationships, grouping relationships, and the like. Ensuring that the interdependencies among the methods are respected refers to, for example, ensuring that the formatted program includes all of the methods that are part of an interdependent relationship. Determining the validity of a formatted program refers to, for example, ensuring that the data format used by each method of the formatted program can be reached by the data format used in the previous method. In one embodiment, a format graph or similar structure may be used to determine the validity of a formatted program.

Referring to process block 620, a cost for the formatted program is determined. In an embodiment, the cost is determined based, at least in part, on a data format efficiency computation. The term "data format efficiency computation" broadly refers to a computation to determine a cost associated with the data formats of methods. In an embodiment, the data format efficiency computation includes determining a processing cost for each data format (or selected data formats) that is selected for each of the one or more methods (or a selected subset of the methods). In one embodiment, the data format efficiency computation includes determining a data format transformation cost for each pair (or selected pairs) of consecutive methods in the sequence of the methods. The data format efficiency computation may account for a direct transformation (e.g., from format A to format B) or a sequence of two or more transformations (e.g., from format A, through format C, to format B). If there is more than one possible sequence of format transformations, the data format efficiency computation may include selecting an efficient sequence of format transformations. In one embodiment, a format graph (or other source of data format transformation information) may be used to select the shortest path between two data formats.

In one embodiment, the process 600 represents a global cost optimization for formatted programs. The term "global cost optimization" refers to an assembly of formatted programs that takes into account more than a single sequence of methods. Typically, taking into account a sequence of methods includes taking into account the data format of each method and/or the format transformation between each pair of consecutive methods.

Referring to process block 630, more sequences for the formatted program may be determined in the course of the global cost optimization process 600. In an embodiment, the methods of the variable program may be arranged into more than one valid formatted method sequence. In such an embodiment, one or a plurality of the possible sequences may be determined. If more than one sequence is determined, then a sequence having an optimal cost (e.g., a minimum cost) may be selected.

Referring to process block 640, the formatted program (sequence of methods) having the optimal cost is selected. The phrase "selecting a formatted program having an optimal cost" refers to, for example, selecting a method sequence based, at least in part, on the processing costs and transformation costs associated with the data formats of the methods of the sequence. In one embodiment, the sequence having the minimum cost (among the determined sequences) is selected.

FIG. 7 is a flow diagram illustrating certain aspects of a process 700 for assembling a formatted program at runtime, according to an embodiment of the invention. In an embodiment, process 700 provides local optimization of the formatted program. In one embodiment, the system for assembling programs (e.g., system 100, shown in FIG. 1) dynamically selects the methods that make up the program based, for example, on a data format efficiency computation. Referring to process block 710, input data is structured according to an initial format. In one embodiment, the initial format is a format of a first or basis method of the program.

Referring to process block 720, one or more methods with which the program could be continued are determined. In an embodiment, determining these methods includes determining which methods of a set of methods are available for use. Referring to process block 730, one of the determined methods is selected to be the next method. A data format for the next method is also determined based, at least in part, on data format information of the next method.

In an embodiment, the selection of the next method and its data format is based, at least in part, on a data format efficiency computation. In one embodiment, the data format efficiency computation is a local data format efficiency computation. The term "local data format efficiency computation" refers to a data format efficiency computation that is substantially based on a single pair of consecutive methods. In an embodiment, the local data format efficiency computation includes selecting a data format for each method in the pair of consecutive methods based, at least in part, on the processing cost associated with the data format. The data format selected for each method may also be based, at least partly, on the transformation cost associated with the sequence of determined data format transformations.

Referring to process block 740, the data is transformed to the selected format and is processed by the selected method. In one embodiment, the data imported by the next method includes at least part of a problem statement. The data exported by the next method may contain a solution (or a partial solution) to the problem as shown by process block 750. If the exported data does not include the solution and the system is not given any information indicating that a program limit is exceeded, then the program is to be extended by at least one more method beginning with process block 720.

Figure 8:
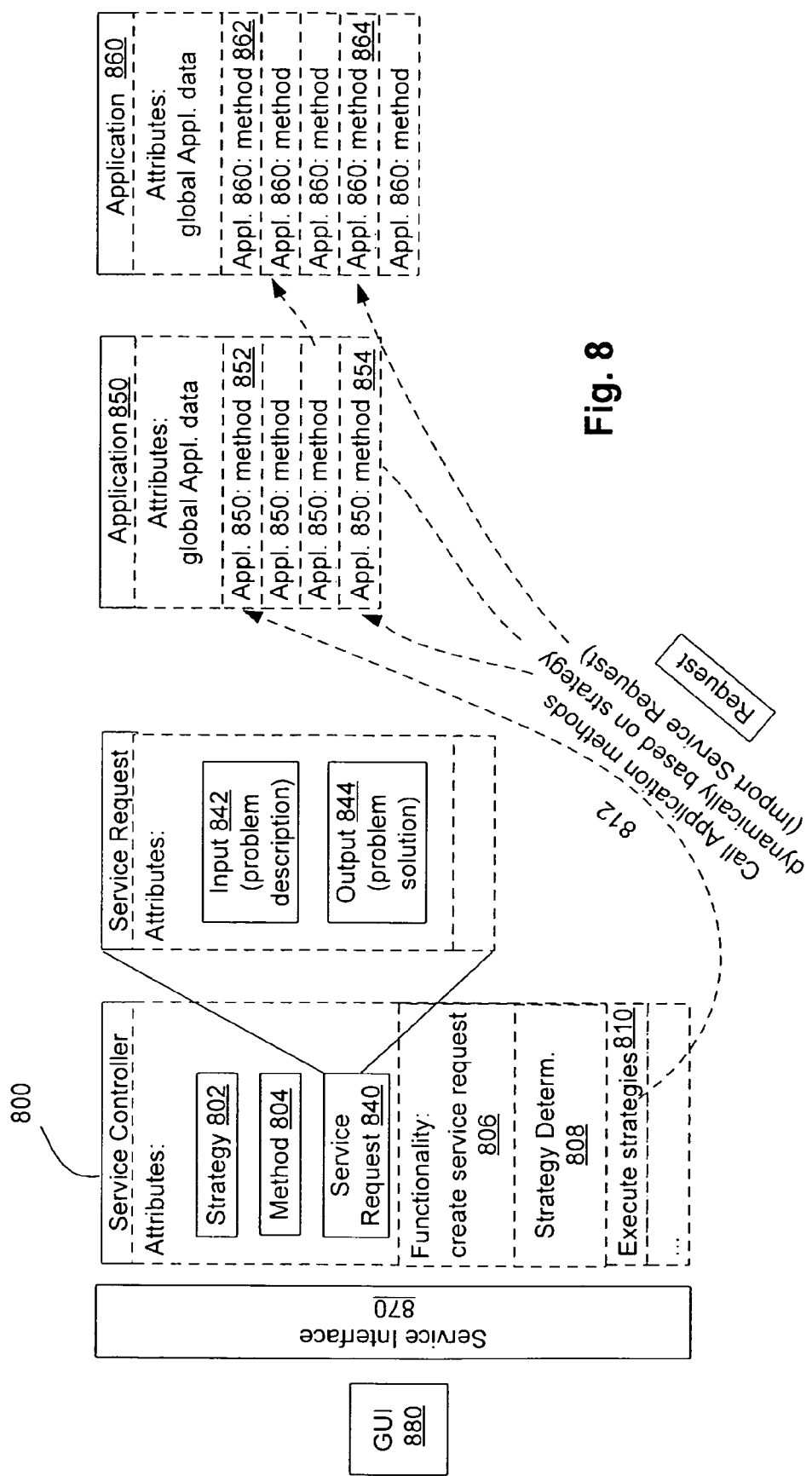
FIG. 8 is a block diagram of selected elements of a cross-application process controller, according to an embodiment of the invention.

In an embodiment, the system and method for assembling programs supports a controller that defines and executes programs for a service across one or a plurality of applications. FIG. 8 is a block diagram of selected elements of service controller 800, according to an embodiment of the invention. The illustrated embodiment of service controller 800 includes as attributes, inter alia, method(s) 804, strategy(ies) 802 as defined by sequences of methods, and service request(s) 840 describing the various demands on this service. In addition, it includes as functionality, inter alia, logic 806 to create service requests, logic 808 to determine a strategy for each service request, and logic 810 to respond to a service request by executing the strategy determined for it. In an alternative embodiment, service controller 800 may have more elements, fewer elements, and/or different elements. In an embodiment, the service independent aspects (e.g., execution of a strategy as a sequential execution of its methods) are provided by a (generic) controller framework, which supports the definition of various software services. These services may be based, at least in part, on a strategy 802 that is defined for each service request 840. Alternatively, service controller 800 may use strategy determination logic 808 to determine a strategy (e.g., strategy 102) for a given service request (e.g., service request 840). As is further described below, service controller 800 also provides a framework to execute strategy 802.

Each method 804 provides a logical processing element for a cross-application process. Method 804 may provide new functionality (e.g., a new method) or may encapsulate existing functionality from integrated applications. Each method 804 is designed to be as technically independent as possible to enhance the flexibility of the definition of strategy 802. In some cases, however, method 804 may share a fixed relationship with one or more other methods, for example, to enable code sharing among methods. Each method 804 shares a common interface. A method pool 806 may encompass all of the methods which may be used to define strategy 802.

Graphical User Interface (GUI) 880 provides an interface to service controller 800. In one embodiment, GUI 880 is a stand-alone GUI. The term "stand-alone" refers to a GUI that functions independently of a Web browser. GUI 880 may provide access to a service specific layer of service controller 800.

Strategy 802 contains one or more methods (e.g., method(s) 804). In an embodiment, strategy 802 defines the order in which the contained methods are executed. This order may be constrained, in part, by the relationships, if any, among the methods. For example, if two methods are selected for strategy 802 and they share a predecessor/successor relationship, then that relationship may partly determine the ordering of those two methods. In addition, if a selected method is in a grouping relationship with one or more other methods, then all of the methods sharing the grouping relationship may be included in strategy 802.

In one embodiment, a program assembly system (e.g., system 100, shown in FIG. 1) supports a user during the strategy definition process. The user may select the methods for the strategy (e.g., strategy 802) based on the functionality provided by the methods. During method selection (or at the end of the selection process) the program assembly system proposes one or multiple sequences for the methods of the strategy. The sequences may be based, at least in part, on a data format efficiency computation.

In an embodiment, service request 840 is an object that represents demands placed on the implemented service. For example, the illustrated embodiment of service request 840 includes input 842 and output 844. Input 842 provides fields and/or functions describing, for example, a business problem to be solved by the implemented service. Output 844 provides fields and/or functions describing a solution to the problem. Service controller 800 constructs service request 840 and processes it. In an embodiment, processing service request 840 includes determining a user-defined strategy 802 for the service request and passing the service request to the methods of strategy 802.

In an embodiment, determining strategy 802 for service request 840 may be explicitly given by input received through service interface 870. Alternatively, service controller 800 may use strategy determination logic 808 to select strategy 802 for service request 840.

Application classes 850 and 860 provide the methods for a variable program. Each of the methods may be associated with an application class (e.g., application class 850 and 860). In an embodiment, each method may store a part of the data that it produces in its associated application class instance. Other methods of the application class may access this data if they follow the same strategy (e.g., strategy 802). In addition, service controller 800 may access data stored in the application class instances to enhance a result before passing the result through service interface 870.

Strategy execution logic 810 provides logic to execute the methods of a strategy (e.g., strategy 802). In an embodiment, strategy execution logic 810 dynamically calls the methods of strategy 802 as shown by 812. Strategy execution logic 810 may pass service request 840 to each method of strategy 802 in the order defined by strategy 802. For example, strategy 802 may dictate that strategy execution logic 810 execute methods 852, 854, 862, and 864 and may further dictate that they are executed in that order. Strategy execution logic 810 may pass service request 840 to each of methods 852, 854, 862, and 864, as it dynamically calls the methods.

Service interface 870 is an input/output interface. In an embodiment, service interface 870 is a service-specific interface. The term "service-specific" refers to an implementation that is specific to a particular cross-application process.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards, or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for assembling an efficient program, comprising:

determining one or more formatted programs, each of the one or more formatted programs including one or more methods;

selecting a data format for a method of at least one of the one or more formatted programs based, at least in part, on data format information defined by the method;

determining a cost for at least one of the one or more formatted programs based, at least in part, on a data format efficiency computation; and selecting, by a computer, the efficient program based, at least in part, on the cost determined for the one or more formatted programs.

2. The method of claim 1, wherein determining one or more formatted programs, comprises:

determining the one or more formatted programs based, at least in part, on at least one of data format information of the methods and method-independent data format transformation information.

3. The method of claim 2, wherein determining one or more formatted programs based, at least in part, on at least one of data format information of the methods and method-independent data format transformation information further comprises:

determining a sequence of data format transformations for a pair of consecutive methods in one of the one or more formatted programs based, at least in part, on the selected data formats of the pair of consecutive methods.

4. The method of claim 3, wherein determining the cost for at least one of the one or more formatted programs based, at least in part, on the data format efficiency computation comprises:

determining a processing cost for each method of the formatted program based, at least in part, on the efficiency of data processing by the method according to the data format selected for the method.

5. The method of claim 4, wherein determining the cost for at least one of the one or more formatted programs based, at least in part, on the data format efficiency computation further comprises:

determining a transformation cost for each pair of consecutive methods in the formatted program based, at least in part, on a cost to perform the sequence of data format transformations determined for the pair of consecutive methods.

6. The method of claim 3, further comprising:

determining whether one of the one or more formatted programs is valid.

7. The method of claim 6, wherein determining whether the formatted program is valid comprises determining one or more of:

predecessor/successor relationships among the methods; and grouping relationships among the methods.

8. The method of the claim 1, further comprising:
receiving an input for the efficient program, the input having a data structure; and
executing the efficient program based, at least in part, on providing the data structure sequentially to each method of the efficient program in the data format selected for each method.

9. The method of claim 8, wherein executing the efficient program based, at least in part, on providing the data structure to each method of the sequence in the data format selected for each method comprises:
dynamically executing the sequence of data format transformations determined for each pair of consecutive methods in the efficient program.

10. An apparatus comprising:
a graphical user interface to display one or more formatted programs, each of the one or more formatted programs having one or more methods; and
a processor and logic executable thereon to determine one or more formatted programs,
wherein the processor and logic select a data format for a method of at least one of the one or more formatted programs based, at least in part, on data format information provided by the method
wherein the processor and logic determines a cost for at least one of the one or more formatted programs based, at least in part, on a data format efficiency computation; and
wherein the processor and logic selects an efficient program based, at least in part, on the costs determined for the one or more formatted programs.

11. The apparatus of claim 10, wherein the logic executable thereon to determine one or more formatted programs comprises logic to:
determine one or more formatted programs based, at least in part, on at least one of data format information of the methods and method-independent data format transformation information.

12. A system for assembling an efficient program, comprising:
means for determining one or more formatted programs, wherein a formatted program includes one or more methods;
means for selecting a data format for a method of one of the one or more formatted programs based, at least in part, on data format information provided by the method
means for determining a cost for at least one of the one or more formatted programs based, at least in part, on a data format efficiency computation; and
means for selecting the efficient program based, at least in part, on the costs determined for the one or more formatted programs.

13. The system of claim 12, wherein the means for determining one or more formatted programs comprises:
means for determining one or more formatted programs based, at least in part, on at least one of data format information of the methods and method-independent data format transformation information.

14. The system of claim 13, wherein the means for determining one or more formatted programs based, at least in part, on at least one of data format information of the methods and method-independent data format transformation information further comprises:
means for determining a sequence of data format transformations for a pair of consecutive methods in one of the one or more formatted programs based, at least in part, on the selected data formats of the pair of consecutive methods.

15. The system of claim 14, wherein the means for determining a cost for at least one of the one or more formatted programs based, at least in part, on the data format efficiency computation comprises:
means for determining a processing cost for each method of the formatted program based, at least in part, on the efficiency of data processing by the method according to the data format selected for the method.

16. The system of claim 15, wherein the means for determining a cost for at least one of the one or more formatted programs based, at least in part, on the data format efficiency computation further comprises:
means for determining a transformation cost for the pair of consecutive methods in the formatted program based, at least in part, on a cost to perform the sequence of data format transformations determined for the pair of consecutive methods.

17. The system of claim 13, further comprising:
means for determining whether one of the one or more formatted programs is valid.

18. The system of claim 17, wherein the means for determining whether one of the one or more formatted programs is valid comprises means for determining whether the formatted program is valid based on one or more of:
predecessor/successor relationships among the methods; and
grouping relationships among the methods.

19. A non-transitory computer readable medium storing instructions for assembling an efficient program, the instructions that when executed by an apparatus, cause the apparatus to:
determine one or more formatted programs, wherein a formatted program includes one or more methods;
select a data format for a method of the one or more formatted programs based, at least in part, on data format information provided by the method
determine a cost for at least one of the one or more formatted programs based, at least in part, on a data format efficiency computation; and
select the efficient program based, at least in part, on the cost determined for the one or more formatted programs.

20. The computer readable medium of claim 19, wherein the instructions that, when executed by the apparatus, cause the apparatus to determine one or more formatted programs, cause the apparatus to:
determine one or more formatted programs based, at least in part, on at least one of data format information of the methods and method-independent data format transformation information.

21. The computer readable medium of claim 20, wherein the instructions that, when executed by the apparatus, cause the apparatus to determine one or more formatted programs based, at least in part, on at least one of data format information of the methods and method-independent data format transformation information, further cause the apparatus to:
determine a sequence of data format transformations for a pair of consecutive methods in one of the one or more formatted programs based, at least in part, on the selected data formats of the pair of consecutive methods.

22. The computer readable medium of claim 21, wherein the instructions that, when executed by the apparatus, cause the apparatus to determine a cost for at least one of the one or more formatted programs based, at least in part, on the data format efficiency computation, cause the apparatus to:

determine a processing cost for a method of the one of the one or more formatted programs based, at least in part, on the efficiency of data processing by the method according to the data format selected for the method.

23. The computer readable medium of claim 22, wherein the instructions that, when executed by the apparatus, cause the apparatus to determine a cost for at least one of the one or more formatted programs based, at least in part, on the data format efficiency computation, further cause the apparatus to:
   determine a transformation cost for the pair of consecutive methods in the formatted program based, at least in part, on a cost to perform the sequence of data format transformations determined for the pair of consecutive methods.

24. The computer readable medium of claim 21, wherein the electronically accessible medium provides further instructions that, when executed by the apparatus, cause the apparatus to:
   determine whether one of the one or more formatted program is valid.

25. The computer readable medium of claim 24, wherein the instructions that, when executed by the apparatus, cause the apparatus to determine whether the one of the one or more formatted program is valid cause the apparatus to determine whether the one of the one or more formatted program is valid based on one or more of:
   predecessor/successor relationships among the methods; and
   grouping relationships among the methods.

26. The computer readable medium of claim 19, wherein the electronically accessible medium provides further instructions that, when executed by the apparatus, cause the apparatus to:
   receive an input for the efficient program, the input having a data structure; and
   execute the efficient program based, at least in part, on providing the data structure sequentially to each method of the efficient program in the data format selected for the method.

* * * * *